No. 50,629. PATENTED OCT. 24, 1865.
A. J. ROBERTS.
STREET SWEEPING MACHINE.
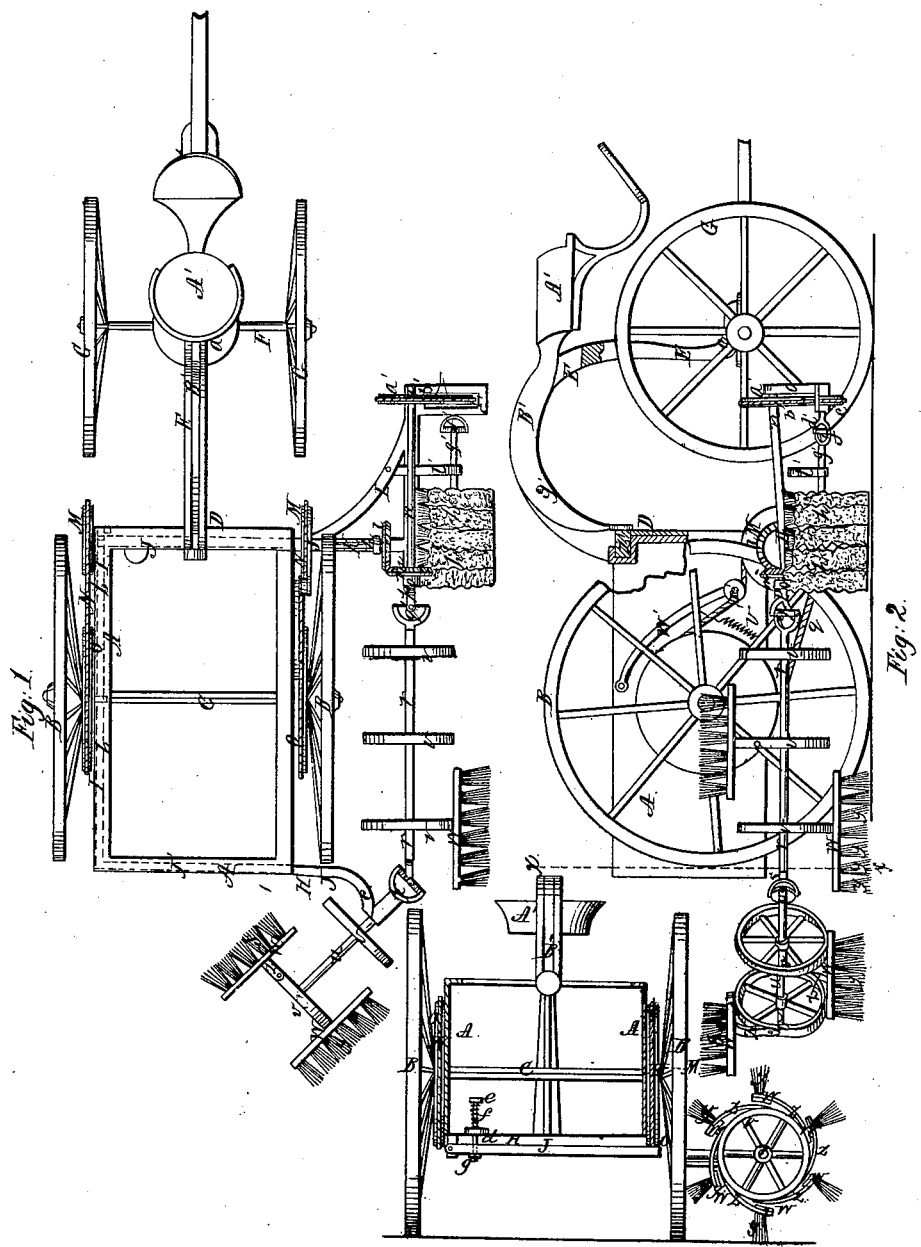
Witnesses: Inventor:

UNITED STATES PATENT OFFICE.

ANDREW J. ROBERTS, OF BOSTON, MASSACHUSETTS.

IMPROVED STREET-SWEEPING MACHINE.

Specification forming part of Letters Patent No. 50,629, dated October 24, 1865.

*To all whom it may concern:*

Be it known that I, ANDREW J. ROBERTS, of Boston, in the county of Suffolk and State of Massachusetts, have invented new and useful Improvements in Street-Sweeping Machines; and I do hereby declare that the following is a full, clear, and exact description thereof, which will enable those skilled in the art to make and use the same, reference being had to the accompanying drawings, forming part of this specification.

It has long been a great desideratum to produce machines adapted to the sweeping of streets without necessitating the employment of hand-labor in connection therewith otherwise than to direct or manage the horse or other power used.

Many machines have been heretofore invented and patented with this object in view, but with most of them the streets could not be swept sufficiently close to the curbstones as was necessary or desirable, they requiring in addition thereto the employment of quite a large number of laborers to complete the work, whereby the expense was not only increased, but also it seriously operated to prejudice the minds of the people against the introduction and employment of machinery for sweeping streets, they being deemed not only imperfect in many respects, but possessing such slight and small advantages over hand-labor as to render their introduction impracticable, or at least accompanied with but few beneficial or useful results.

To provide a machine with which the dirt and other refuse matter of the streets lying close to the curbstones can be swept or thrown into the central portion of the street, or at least a sufficient distance to enable it to be then swept up or removed by any of the ordinary street-sweeping machines, is the object of the present invention and is secured thereby, it principally consisting in arranging upon and along the outside of the driving-wheels, and upon a common shaft extending in the same direction with that in which the machine moves, a series of brushes or brooms made of any material adapted to street-sweeping, which brushes, as the machine is drawn forward, revolve in a plane at right angles to the same, so that by guiding the machine along by the edge of the curbstone the brushes are thus brought close to the same, consequently as they revolve, sweeping or throwing out the dirt and other refuse matters in the street near and within a short distance of the curbstone toward the central portion of the street, or at least a sufficient distance to enable any of the ordinary sweeping-machines when afterward drawn over the ground to sweep them up into a wagon therefor or into suitable heaps to be easily and readily thrown into a dust-cart for their removal.

In addition to the above I have also made other improvements in the arrangement of the parts composing the machine, whereby it is rendered quite efficient and practical for the purpose for which it is intended, as will be manifest from the following detail description of the same, reference being had to the accompanying plate of drawings, in which—

Figure 1 is a plan or top view; Fig. 2, a side view, and Fig. 3 a transverse vertical section taken in the plane of the line *x x*, Fig. 2.

A A in the drawings represent a box or frame, to the sides of which the hind wheels, B B, of the machine are hung upon the rear cross-axle, C, extending across the box A, and secured near each end in the sides of the same. To the front portion, D, of the box, and extending from its upper edge, is a crane-neck shaped or bent bar, E, in the lower end, *a*, of which the front axle, F, having wheels G G, is hung, so as to swing, the bent bar E being of such a shape as to allow the front wheels to pass under it, thereby enabling the machine to be moved with more freedom when used.

H is a horizontal frame consisting of a side piece, *b*, made in two parts or sections, turning at each end in bearings of the box, upon its lower edge, and extending from one end to the other along the side I of the same, and of two right-angular projecting arms, J J', attached to or forming a part of the side piece, *b*, at each of its outer ends, and of sufficient length to extend across the box A and beyond the hind wheels, B B, the rear arm, J', being slightly bent at its outer end, *c*.

*d* is a screw-bolt, passing up through each of the arms J J' and lower edge of box A, having upon its upper end a head or cap plate, *e*, between which and the box A a spiral spring, $f$, is placed, the lower end having a thumb-nut, $g$, by screwing which to the right or left the frame can be raised or lowered at pleasure, and for a purpose to be hereinafter described.

K is a horizontal shaft, extending across the front end of the box A and under the same, turning in bearings at one end of the bar J, before referred to, and at the other of the extension portion L of the same, and having at or near each of its ends a small fixed pulley, M, connected by a belt or band, N, with the larger pulleys O O upon the rear axle-tree, C. On outer end, $h$, of shaft K is a vertical bevel-gear wheel, $l$, interlocking with which is a similar gear, $m$, of a longitudinal horizontal shaft, $n$, turning at each end in standards $o\ o$ of bar-extension L. To the inner end, $p$, of shaft $n$, by a universal joint, $q$, is hung one end of a longitudinal horizontal broom-shaft, $r$, placed outside of the wheels B B, and hung at its other end by a similar joint, $s$, to the inner end, $t$, of an inclined horizontal broom-shaft, $u$, turning in bearings of the curved portion of the bar J′, before referred to.

$v\ v$ represent a series of fixed wheels or circular frames attached to the horizontal broom-shafts $r$ and $u$ at suitable points of the same, and at short distances from each other to, and upon the periphery of each of which wheels the frames $w\ w$, in which the brooms $y\ y\ y$ used, are inserted, are hung by means of bent metallic spring plates or bars $z\ z$, so that the brooms can adjust themselves to the inequalities in the surface of the ground over which they pass, as will be presently explained. A series of these broom-frames $w\ w$ are hung upon each wheel $v$, as above described, and at suitable distances apart, and are of such length that when all are so fastened thereto a series of brushes of a continuous length for the shafts $r$ and $u$ will be formed.

$a'$ is a pulley on outer end of shaft $n$, connected by a belt, $b'$, with a smaller pulley, $c'$, of a short shaft, $d'$, turning in bearings of the bar-extension part L, to which at one end, $f'$, is hung, by a universal joint, a horizontal broom-shaft, $g'$, extending along in the direction of the length of the machine and outside of the broom-shaft $r$. In this shaft $g$ are inserted a series of radial brooms, $h'\ h'$, made of any suitable or of the ordinary materials used for street-brooms; and to impart flexibility and elasticity to the shaft and its brooms, so as to enable the latter to adjust themselves to the ground upon which they move, I secure to the shaft, and extending therefrom to the extension-part L, a bent spring-plate, $l'$.

As the machine is drawn along over the ground which is to be swept, by the horses attached to it or by any other suitable power, it is guided in the proper direction to bring its series of brushes upon the outside of the same and along one of its sides, to or sufficiently close to the curbstone of the street that as they revolve through the devices connecting their respective shafts with the hind or rear wheels, B B, of the machine, they shall sweep close up to the curbstone, throwing the dirt out from the same toward the central portion of the street, the brush $h'$, which is the first of the series, being of such size and shape as to sweep directly up to the edge of the curbstone, adjusting itself thereto through the spring-plate $l'$, by which it is partially hung to the machine, the dirt thus swept away therefrom being then still further thrown out into the street by the next series of brushes, $y\ y$, when it is sufficiently swept toward the central portion of the street by the series of brushes $y$ upon the inclined brush-shaft $u$, where it is in the best position to be finally swept up by any of the ordinary sweeping-machines now in use or invented and patented, as is evident without further description.

The inclined brushes may be dispensed with, if deemed expedient, as the other series of brushes would sufficiently sweep the dirt into the street, but with the inclined series the dirt can be swept to such a distance as to render only one passage of the ordinary sweeping-machines over the street necessary in streets of the usual and common widths.

From the above description it is evident that a machine suitable for sweeping the dirt of streets away from the curbstone and into the portion of the street from which the ordinary sweeping-machines are only adapted to remove and sweep it, has been produced, the advantages and importance of which are so manifest to all who have had experience in the use of street-sweeping machines as to render any mention of them herein superfluous.

By the manner in which the frame containing or holding the broom-shaft is hung upon the body of the machine it is evident that the brushes can be raised or lowered according as may be desirable or necessary; and that, furthermore, in conjunction therewith, attaching the broom-frames to their common shafts by means of spring-plates, as described, a perfect adjustment, as it were, of the brushes to the inequalities of the surface of the ground is obtained, the importance of which, in order to secure a clean sweep of the streets, are well known.

A′ is the driver's seat, attached to a bent arm, B′, corresponding in shape to that of the crane-shaped neck E, in a groove of which it is hung upon a pivot or fulcrum, $y'$, its inner end resting and bearing against a rubber cushion or other suitable spring, $z'$, of the machine-frame A. By arranging the driver's seat in this manner an easy and elastic movement is given to it as the wagon moves over the pavements of the street, the advantages of which are manifest to all.

In order to keep the driving-belt passing around the pulley upon the outer or broom end of the right-angular bar J at the proper tension to communicate motion to the said pulley from the driving-pulley of the rear wheel, B, and to prevent the belt from sagging in consequence of the upward and downward play of the frame H, I arrange upon the side of the box A a spring-lever arm, $w'$, having on its outer end a pulley, $x'$, bearing against the belt, which arm, through its spring $v'$, continually bears against the belt, retaining and always holding it at the proper tension to transmit the motion desired.

I claim as new, and desire to secure by Letters Patent—

1. So arranging a series of brooms or brushes, either one or more, to and upon the outside of a suitable wagon-frame, in the direction of its length, and so connecting their shaft or shafts to and with the driving or rear wheels thereof, that as the wagon is drawn forward the said brushes or brooms shall be made to revolve in a direction at right angles, or nearly so, to the direction in which the wagon moves, substantially as and for the purpose specified.

2. The combination of the angular or inclined horizontal brush-shaft $u$ with the side brush-shaft, $r$, both provided with a series of suitable brushes or brooms, and arranged together and connected with the driving-wheels of the wagon-frame, substantially as described, and for the purpose specified.

3. In combination with the above, and either when used separately or together, the use of the horizontal broom-shaft $g'$, substantially as and for the purpose specified.

4. Hanging the frame in which the several broom-shafts have their bearings and are suspended in such a manner that their brushes can be raised from or lowered to the ground at pleasure, and can adjust themselves to the inequalities thereof as they are revolved, substantially as hereinabove described.

5. Attaching the driver's seat to and upon the outer end of a lever-arm, B', turning upon a fulcrum, $y'$, of the crane-neck-shaped bar E, and bearing by its inner end against a fixed elastic cushion or spring, $z'$, of the wagon-frame, as and for the purpose specified.

6. The use of the spring-lever $w'$, having pulley $x'$, of the wagon-frame, in combination with the driving belt or band N, as and for the purpose described.

7. Attaching the frames in which the brooms or brushes used are fastened to their shaft by means of one or more bent or other suitable metallic springs, for the purpose and substantially as described.

A. J. ROBERTS.

Witnesses:
ALBERT W. BROWN,
C. L. TOPLIFF.